(No Model.)

F. E. MERRIMAN.
BEE FEEDER.

No. 416,935. Patented Dec. 10, 1889.

WITNESSES
Walter Allen
F. A. Hopkins

INVENTOR
Francis E. Merriman

UNITED STATES PATENT OFFICE.

FRANCIS E. MERRIMAN, OF BOSTON, MASSACHUSETTS.

BEE-FEEDER.

SPECIFICATION forming part of Letters Patent No. 416,935, dated December 10, 1889.

Application filed August 2, 1889. Serial No. 319,530. (No model.)

*To all whom it may concern:*

Be it known that I, FRANCIS E. MERRIMAN, a citizen of the United States, residing at Boston, in the county of Suffolk and State of Massachusetts, have invented certain new and useful Improvements in Bee-Feeders, of which the following is a full and clear description, reference being had to the accompanying drawings, forming part of this specification, in which—

Figure 1:
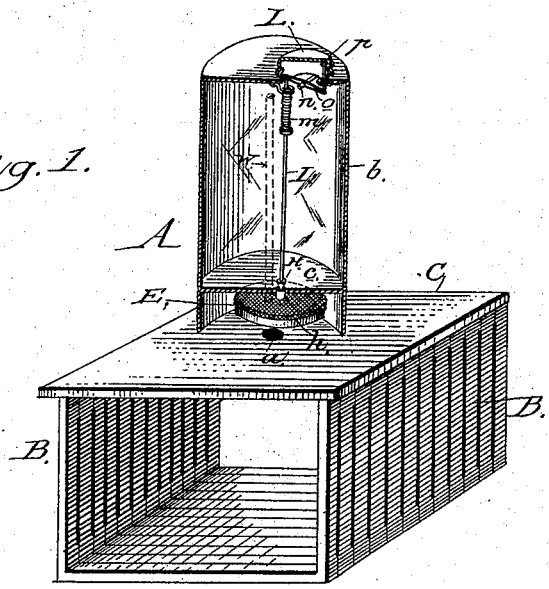
Figure 2:
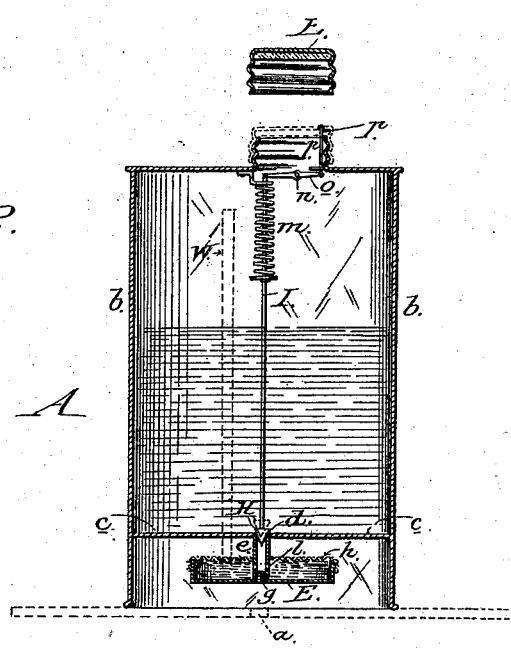

Figure 1 represents a perspective view, partially in section, of a bee-feeder embodying my invention. Fig. 2 is an enlarged sectional view of the feeder removed, showing the valve, valve-actuating mechanism, and the supply-cup.

My invention relates to devices for automatically feeding bees with honey, sirup, and like material; and it consists in the constructions and combinations of devices which I shall hereinafter fully describe and specifically claim.

To enable others skilled in the art to which my invention appertains to make and use the same, I will now describe its construction and indicate a preferred manner of carrying the same out.

In the said drawings, A represents the feeder, which may be placed upon any suitable frame-work, which in this case is shown as consisting of frames B, that resemble the frames of an ordinary brood-chamber, and having a top or honey-board C, which is pierced with an opening $a$ to permit the bees to have a free passage to and from the feeder. This frame-work may represent the interior of a hive, or it may be a separate piece set in the hive, or it may be otherwise located, the only essential feature of it being the top or platform C, with its opening for the passage of the bees.

The feeder A consists of an outer tank or receptacle $b$, which contains the honey or sirup, and which is open at its bottom and is adapted to be placed upon the top or honey-board C, so that it will inclose the opening $a$ therein. Above the open bottom of the tank or receptacle $b$ is a partition $c$, which is provided with an opening $d$ for the discharge of the honey or sirup, and from said opening depends a short tube $e$, which is fitted therein in any suitable manner, the said tube having its lower end threaded and adapted for engagement with a threaded stud or projection $g$, rising from the bottom of the supply-cup E, whereby the latter is secured in the outer tank or vessel slightly below the partition $c$ and in communication with the discharge-opening $d$. This supply-cup is preferably shallow, and will be provided with a covering $h$, of wire gauze or netting, through which the bees sip their feed, and which, while it permits the bees to get at the contents of the cup, prevents their being destroyed by contact therewith. The tube $e$ is provided with one or more discharge-openings $l$, emptying into the cup, and the top of said tube, which forms the discharge-opening in the partition $c$, is closed by a vertically-moving conical valve H, that is connected with a valve-stem I, working in guides and having a spring $m$, which projects the valve into the top of the discharge-tube when the screw-cap of the outer tank or receptable is removed, thereby cutting off any further flow of the honey or sirup. Within the tank or outer vessel is a bar $n$, upon which is pivoted a lever $o$, one end of which is attached to the valve-stem, while the opposite end is connected with a rod $p$, that extends upwardly through the filling-opening in the top of the outer tank and slightly beyond the top thereof, so that it may be engaged and vertically moved by the top of the screw-cap L striking it when said cap is screwed down. As the screw-cap is thus screwed into position it strikes the projected end of the rod $p$, and by depressing said rod causes the lever $o$ to rock on its pivot, thereby drawing up the valve-stem and causing the valve to slightly uncover the top of the discharge-tube and permitting the honey or sirup to flow into the supply-cup and to continue to flow until the opening $l$ in said tube is covered by the rising material, when the flow ceases until enough of the material has been consumed to again expose this opening $l$, when the flow again commences. When the screw-cap is turned to unscrew it, the spring $m$ operates to project the valve downward into the discharge-opening in the partition, or, in other words, to close the top of the discharge-tube $e$, and the rod $p$ is projected upward, with its upper end beyond the top of the filling-opening, so that it may be engaged when the screw-cap is again screwed into position.

If desired, an air-tube W (shown in dotted lines) may enter the supply-cup, whereby air is caused to enter said cup through said tube instead of through the discharge-tube e. This tube W is desirable when the honey or sirup is thick and would be retarded in its flow by the air and food passing through the same outlet.

From the description it will be seen the bees enter from beneath the top or honey-board through the opening therein and have free access to the supply-cup, which may be unscrewed from the tube e and readily cleaned when necessary.

This feeder may be placed in position in the autumn and left in place during the winter months. It is observed that the outer tank or receptacle is open at the bottom, and this open bottom is placed directly over the opening in the honey-board, beneath which the bees cluster, and that the feeder may be securely packed with the hive for winter, and if required to feed the bees sirup or honey is poured through the filling-opening in the outer tank or receptacle, and when the screw-cap is fitted into position the valve is automatically opened and the material permitted to flow into the supply-cup without difficulty and without in any manner disturbing the bees or exposing them to the cold.

Having thus described my invention, what I claim as new, and desire to secure by Letters Patent, is—

1. In a bee-feeder, the combination, with a board having an opening for the bees, of a tank or receptacle adapted to contain the feed for the bees and having a partition and an open bottom adapted to be seated over the opening in the board, a supply-cup in said tank below the partition, a tube connecting the supply-cup with the discharge-opening in the partition, and a conical valve adapted to close the discharge-opening when the cover of the tank or receptacle is removed and to open communication between the tank and supply-cup when the cover is placed in position, substantially as herein described.

2. In a bee-feeder, the combination, with a board or platform having an opening therein for the bees, of a tank adapted to contain the feed for the bees, said tank having a partition c, an open bottom, and a screw-cap which fits the filling-opening, a supply-cup below the partition, a tube communicating with the supply-cup and the feed within the tank, a valve adapted to close the inlet end of said tube, a valve-stem, and a pivoted lever connected with the valve-stem and with a rod which is moved by the putting on of the screw-cap, substantially as herein described.

3. In a bee-feeder, the feed-containing tank or receptacle having an open bottom and a partition with a discharge-opening, in combination with a supply-cup having a tube which connects it with the partition, whereby the feed may flow into the cup, a vertically-moving conical valve adapted to be seated on the inlet of the tube, a valve-stem, a pivoted lever connected at one end with the valve-stem and having a vertical arm which projects through the filling-opening in the tank, whereby it may be engaged by the putting on of the screw-cap and the valve raised, and a spring for seating said valve when the screw-cap is removed, substantially as herein described.

4. In a bee-feeder, the combination, with a tank or vessel adapted to contain the feed for the bees and having a discharge-opening and a valve, and valve-actuating mechanism which is tripped by the putting on and off of the cover of the tank, of a supply-cup, a tube threaded to the cup and having a discharge-aperture whereby the feed may flow from the tank into the cup when the valve is raised, and a foraminous cover for the supply-cup, substantially as and for the purpose described.

5. In a bee-feeder, the tank with its discharge-tube, valve, and valve-actuating mechanism, in combination with a supply-cup having a threaded projection which engages the tube, whereby the cup is removably secured and receives the feed from the tank, and a cover of wire netting or gauze for said cup, substantially as herein described.

6. In a bee-feeder, the tank with its discharge-tube, valve, and valve-actuating mechanism, in combination with a supply-cup fitted to the discharge-tube and an air-tube having its upper end communicating with the upper part of the tank and its lower end entering the supply-cup, substantially as herein described.

In testimony whereof I affix my signature in presence of two witnesses.

FRANCIS E. MERRIMAN.

Witnesses:
HENRY W. FOLSOM,
HENRY W. HOLLAND.